(12) United States Patent
Kitaura et al.

(10) Patent No.: US 7,008,681 B2
(45) Date of Patent: Mar. 7, 2006

(54) OPTICAL INFORMATION RECORDING MEDIUM AND MANUFACTURING METHOD AND RECORDING/REPRODUCING METHOD FOR THE SAME

(75) Inventors: Hideki Kitaura, Souraku-gun (JP); Takashi Nishihara, Hirakata (JP); Yoshitaka Sakaue, Hirakata (JP); Rie Kojima, Kadoma (JP); Noboru Yamada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/389,209

(22) Filed: Mar. 12, 2003

(65) Prior Publication Data

US 2003/0180497 A1    Sep. 25, 2003

(30) Foreign Application Priority Data

Mar. 15, 2002 (JP) .............................. 2002-071865

(51) Int. Cl.
*B32B 3/02* (2006.01)

(52) U.S. Cl. .................. 428/64.1; 428/64.5; 428/64.6; 430/270.13

(58) Field of Classification Search .............. 428/64.1, 428/64.4, 64.5, 64.6, 913; 430/270.13, 495.1, 430/945
See application file for complete search history.

(56) References Cited

U.S. PATENT DOCUMENTS

| | | | |
|---|---|---|---|
| 5,965,229 A * | 10/1999 | Zhou et al. ................ | 428/64.4 |
| 6,312,779 B1 | 11/2001 | Hirotsune et al. | |
| 6,352,753 B1 * | 3/2002 | Nonaka et al. ............ | 428/64.1 |
| 6,355,326 B1 | 3/2002 | Lee et al. | |
| 6,406,771 B1 * | 6/2002 | Nakakuki et al. .......... | 428/64.1 |
| 6,432,502 B1 * | 8/2002 | Kitaura et al. ............. | 428/64.1 |
| 6,660,451 B1 | 12/2003 | Sakaue et al. | |
| 6,689,445 B1 * | 2/2004 | Kojima et al. ............. | 428/64.2 |
| 2002/0098315 A1 * | 7/2002 | Tabata ....................... | 428/64.4 |

FOREIGN PATENT DOCUMENTS

| | | |
|---|---|---|
| CN | 1249506 | 4/2000 |
| EP | 0825595 | 2/1998 |
| EP | 1 001 415 | 5/2000 |
| EP | 1 039 448 | 9/2000 |

(Continued)

OTHER PUBLICATIONS

"Handbook of Thin Film Process Technology," edited by the Thin Film and Surfaces Physics Division of the Japan Society of Applied Physics, Kyoritsu Shuppan Co., Ltd., Japan 1991.

*Primary Examiner*—Elizabeth Mulvaney
(74) *Attorney, Agent, or Firm*—Hamre, Schumann, Mueller & Larson, P.C.

(57) ABSTRACT

An optical information recording medium of the present invention includes at least one information layer. The information layer includes a first protective film, a first interface film, a recording film having the optical characteristics that are changed reversibly by laser beam irradiation, a second interface film, a second protective film, and a reflective film, present in the indicated order from the laser beam incident side. The first interface film includes an oxide of at least one element selected from the group consisting of Ti, Zr, Hf, V, Nb, Ta, Cr, Mo, W, and Si. The second interface film includes carbon or a carbide of at least one element selected from the group consisting of Ti, Zr, Hf, V, Nb, Ta, Cr, Mo, W, and Si.

18 Claims, 2 Drawing Sheets

FOREIGN PATENT DOCUMENTS

| | | |
|---|---|---|
| EP | 1 096 485 | 5/2001 |
| JP | 5-217211 | 8/1993 |
| JP | 2001-331970 | 11/2001 |
| WO | 97/34298 | 9/1997 |

\* cited by examiner

OPTICAL INFORMATION RECORDING MEDIUM AND MANUFACTURING METHOD AND RECORDING/REPRODUCING METHOD FOR THE SAME

BACKGROUND OF THE INVENTION

1. Field of the Invention

The present invention relates to an optical information recording medium that can record/reproduce high quality information signals by irradiating a thin film formed on a substrate with a high energy beam such as a laser beam. The present invention also relates to a manufacturing method and a recording/reproducing method for the optical information recording medium.

2. Description of the Related Art

It is widely known that a thin film made of a chalcogen material or the like is formed on a substrate and irradiated with a laser beam for local heating so as to cause a phase change between an amorphous phase and a crystalline phase depending on the irradiation conditions. The amorphous phase and the crystalline phase differ in optical constants (refractive index n and extinction coefficient k). The research and development of a so-called phase change optical information recording medium, which uses such a chalcogen thin film as a recording film by taking advantage of the phase change phenomenon, has been conducted actively in recent years.

In the phase change optical information recording medium, a new signal can be recorded while erasing the existing signal, e.g., by irradiating an information track with a laser beam that is modulated between at least two power levels of a recording level and an erasing level in accordance with the information signal.

This phase change optical information recording medium generally has a multi-film laminating structure that includes a recording film and additional films other than the recording film. In many cases, the additional films include, e.g., a protective film made of a dielectric material, a reflective film made of a metal or alloy material, etc.

The protective film has, e.g., the following functions of:

1) protecting the recording film from external mechanical damage;

2) reducing thermal damage caused by repetitions of rewriting signals, such as the thermal deformation of a substrate surface, the defects of the recording film, and the evaporation of components of the recording film, thus increasing the number of rewriting operations;

3) enhancing an optical change by utilizing the interference effect of multiple reflection; and 4) preventing a chemical change of the recording film by blocking off the outside air.

To achieve the above functions of the protective film, e.g., an oxide such as $Al_2O_3$, $TiO_2$, and $SiO_2$, a nitride such as $Si_3N_4$ and AlN, an oxynitride such as Si—O—N, a sulfide such as ZnS, a carbide such as SiC, or a mixture of these compounds such as $ZnS$—$SiO_2$ have been proposed and used as a material for the protective film. $ZnS$—$SiO_2$ is most widely used for the following reasons. Particularly, the thermal conductivity of $ZnS$—$SiO_2$ is considerably lower than that of the other dielectric materials. Therefore, $ZnS$—$SiO_2$ sufficiently can suppress thermal diffusion that occurs when a laser beam or the like is used for recording, and improve the recording sensitivity. A $ZnS$—$SiO_2$ film causes fewer defects even if it has a large thickness because of its small internal stress. Moreover, even if the laser beam irradiation is repeated, the film does not peel off easily because of its excellent adhesion to the recording film made of a phase change material.

An interface film provided between the recording film and the protective film has been proposed. The interface film has, e.g., the following functions of:

1) accelerating the crystallization of the recording film to improve the erasing characteristics; and 2) preventing the interdiffusion of substances between the recording film and the protective film to improve the durability for repetitive recording.

It is more desirable that the interface film also has environmental reliability such that it is not corroded and peeled off from the recording film.

As a material for the interface film, e.g., a nitride of Si or Ge is much superior in the effects of accelerating the crystallization of the recording film and preventing the diffusion of the substances (disclosed, e.g., by JP 5(1993)-217211 A and WO 97/34298). Particularly, an interface film that includes Ge—N as the main component and Cr or the like does not peel off easily from the recording film even under high temperature and high humidity. Therefore, this material is one of the most suitable materials for the interface film.

The amount of information to be stored in the above optical information recording medium can be increased basically when the spot diameter of a laser beam is reduced to improve the areal recording density. The spot diameter can be reduced by shortening the wavelength of a laser beam or increasing the numerical aperture of an objective lens for focusing the laser beam. In recent years, it has been proposed that a blue laser diode having a wavelength of about 400 nm, which is proceeding toward practical use, is used in an optical system for recording/reproducing information with respect to an optical information recording medium, and that the numerical aperture of an objective lens of the optical system is increased, e.g., from 0.60 for DVD-RAM (DVD-Random Access Memory) etc. to about 0.85, thereby reducing the laser spot diameter to improve the areal recording density. However, an increase in numerical aperture causes a decrease in tolerance for tilt of the optical information recording medium. Therefore, it also has been proposed that the thickness of a transparent substrate located on the laser beam incident side is reduced from 0.6 mm for DVD-RAM etc. to about 0.1 mm.

To increase the amount of information available for a single optical information recording medium, an optical information recording medium having a multilayer structure (referred to as "multilayer recording medium" in the following of this specification) has been proposed as well. The multilayer recording medium includes a plurality of layers for recording/reproducing information (referred to as "information layer" in the following of this specification). In the multilayer recording medium, a laser beam is absorbed by an information layer located closer to the laser source, so that the attenuated laser beam is used to record/reproduce information with respect to an information layer located farther from the laser source. This causes the problems of reduction in sensitivity for recording and in reflectance and amplitude for reproduction. Therefore, the information layer located closer to the laser source should have a higher transmittance, while the information layer located farther from the light source should have a higher reflectance, reflectance difference (i.e., a difference in reflectance between the crystalline phase and the amorphous phase of the recording film), and sensitivity so as to achieve sufficient recording/reproducing characteristics with limited laser power.

The use of a blue laser and an objective lens having a large numerical aperture increases the energy density of the laser beam. Therefore, the recording film in the information layer absorbs the laser beam during reproduction, and a portion of a recording mark disappears more easily. This phenomenon is called "degradation caused by reproduction light." To solve this problem, the light absorption of the recording film can be reduced by allowing any film in the information layer other than the recording film (e.g., the interface film) to absorb light appropriately, thus suppressing the degradation caused by reproduction light, i.e., improving the durability against reproduction light.

However, this method leads to a reduction in reflectance change and lowers the signal quality such as a C/N ratio.

SUMMARY OF THE INVENTION

A first optical information recording medium of the present invention includes at least one information layer. The information layer includes a first protective film, a first interface film, a recording film having the optical characteristics that are changed reversibly by laser beam irradiation, a second interface film, a second protective film, and a reflective film, present in the indicated order from the laser beam incident side. The first interface film includes an oxide of at least one element selected from the group consisting of Ti, Zr, Hf, V, Nb, Ta, Cr, Mo, W, and Si. The second interface film includes carbon or a carbide of at least one element selected from the group consisting of Ti, Zr, Hf, V, Nb, Ta, Cr, Mo, W, and Si.

A second optical information recording medium of the present invention includes at least one information layer. The information layer includes a first protective film, a recording film having the optical characteristics that are changed reversibly by laser beam irradiation, an interface film, a second protective film, and a reflective film, present in the indicated order from the laser beam incident side. The interface film includes carbon or a carbide of at least one element selected from the group consisting of Ti, Zr, Hf, V, Nb, Ta, Cr, Mo, W, and Si and has a thickness of not less than 0.3 nm and less than 3 nm.

A method for recording/reproducing information with respect to an optical information recording medium of the present invention includes recording/reproducing information with respect to the first or the second optical information recording medium. The information is recorded/reproduced by an optical system having a wavelength of not more than 450 nm and a numerical aperture of not less than 0.8.

A first method for manufacturing an optical information recording medium of the present invention includes forming at least one information layer on a first substrate and forming a second substrate on the at least one information layer. The information layer is formed by forming at least a first protective film, a first interface film, a recording film, a second interface film, and a second protective film in the indicated order or in the reverse order. The first protective film is made of a dielectric material. The first interface film includes an oxide of at least one element selected from the group consisting of Ti, Zr, Hf, V, Nb, Ta, Cr, Mo, W, and Si. The recording film has the optical characteristics that are changed reversibly by laser beam irradiation. The second interface film includes carbon or a carbide of at least one element selected from the group consisting of Ti, Zr, Hf, V, Nb, Ta, Cr, Mo, W, and Si. The second protective film is made of a dielectric material.

A second method for manufacturing an optical information recording medium of the present invention includes forming at least one information layer on a first substrate and forming a second substrate on the at least one information layer. The information layer is formed by forming at least a first protective film, a recording film, an interface film, and a second protective film in the indicated order or in the reverse order. The first protective film is made of a dielectric material. The recording film has the optical characteristics that are changed reversibly by laser beam irradiation. The interface film includes carbon or a carbide of at least one element selected from the group consisting of Ti, Zr, Hf, V, Nb, Ta, Cr, Mo, W, and Si and a thickness of not less than 0.3 nm and less than 3 nm. The second protective film is made of a dielectric material.

DESCRIPTION OF THE PREFERRED EMBODIMENTS

The first and the second optical information recording medium of the present invention can improve both the signal quality and the durability against reproduction light, even if information is recorded/reproduced by an optical system that includes a short-wavelength laser beam and a large numerical aperture lens.

In the first optical information recording medium, it is preferable that the first interface film includes a mixture of an oxide of at least one element selected from the group consisting of Ti, Zr, Hf, V, Nb, and Ta and an oxide of at least one element selected from the group consisting of Cr, Mo, and W. Moreover, it is preferable that the mixture includes an oxide of at least one element selected from the group consisting of Cr, Mo, and W in an amount of 5 mol % to 80 mol % (preferably 10 mol % to 70 mol %, and more preferably 20 mol % to 50 mol %). It is preferable that the mixture further includes a Si oxide, and the Si oxide is 5 mol % to 60 mol % (preferably 10 mol % to 40 mol %) of the mixture. This configuration can achieve higher signal quality and environmental reliability such that the first interface film does not peel off easily from the recording film.

When the first and the second optical information recording medium have a multilayer structure including a first information layer to a nth information layer that are stacked in order from the laser beam incident side (n is a natural number not less than 2), it is preferable that at least one of the first information layer to the nth information layer (preferably the nth information layer) is the same as the above information layer. This configuration can improve the signal quality and the durability against reproduction light, even if information is recorded/reproduced with respect to a multilayer optical information recording medium by an optical system that includes a short-wavelength laser beam and a large numerical aperture lens.

In the first and the second optical information recording medium, it is preferable that the reflective film includes a first film of Al or Al alloy and a second film of Ag alloy, and the first film and the second film are stacked in the indicated order from the laser beam incident side. This configuration can achieve higher signal quality.

In the first and second optical information recording medium, it is preferable that the recording film is at least one selected from the group consisting of a Ge—Sb—Te alloy film, a Ge—Sn—Sb—Te alloy film, a Ag—In—Sb—Te alloy film, an In—Ge—Sb—Te alloy film, and a Ag—In—Ge—Sb—Te alloy film. This configuration can achieve higher signal quality.

The recording/reproducing method for an optical information recording medium of the present invention makes it possible to record and reproduce signals with high quality and high density.

According to the first method for manufacturing an optical information recording medium of the present invention, a first substrate is formed as a transparent substrate that is located on the laser beam incident side, an information layer is formed by forming a first protective film, a first interface film, a recording film, a second interface film, and a second protective film in the indicated order, and a second substrate (in this case, a protective substrate that is located on the opposite side to the laser beam incident side) is formed, thereby producing the first optical information recording medium. The first method also allows the first substrate to be formed as a protective substrate, the information layer to be formed by reversing the film formation order, and the second substrate to be formed as a transparent substrate, thereby producing the first optical information recording medium.

According to a second method for manufacturing an optical information recording medium of the present invention, the second optical information recording medium can be produced in the same manner as that for the first optical information recording medium. Specifically, an information layer is formed on a transparent substrate located on the laser beam incident side and then a protective substrate is formed on the opposite side to the laser beam incident side, or the information layer is formed on a protective substrate and then a transparent substrate is formed.

Hereinafter, an embodiment of the present invention will be described with reference to the drawings.

Figure 1:
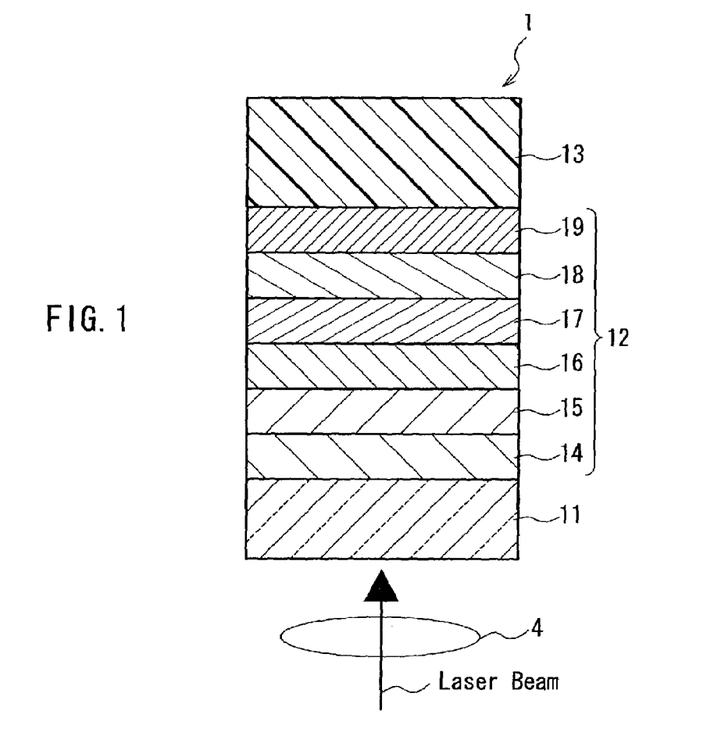
FIG. 1 is a cross-sectional view showing an example of the configuration of an optical information recording medium of the present invention.

FIG. 1 is a cross-sectional view showing an example of the configuration of an optical information recording medium of the present invention. As shown in FIG. 1, an optical information recording medium 1 includes a transparent substrate 11, an information layer 12 formed on the transparent substrate 11, and a protective layer 13 formed on the information layer 12. Information is recorded/reproduced by irradiating the optical information recording medium 1 with a laser beam focused by an objective lens 4 from the transparent substrate side. The information layer 12 includes a first protective film 14, a first interface film 15, a recording film 16, a second interface film 17, a second protective film 18, and a reflective film 19 in the indicated order from the laser beam incident side.

Figure 2:
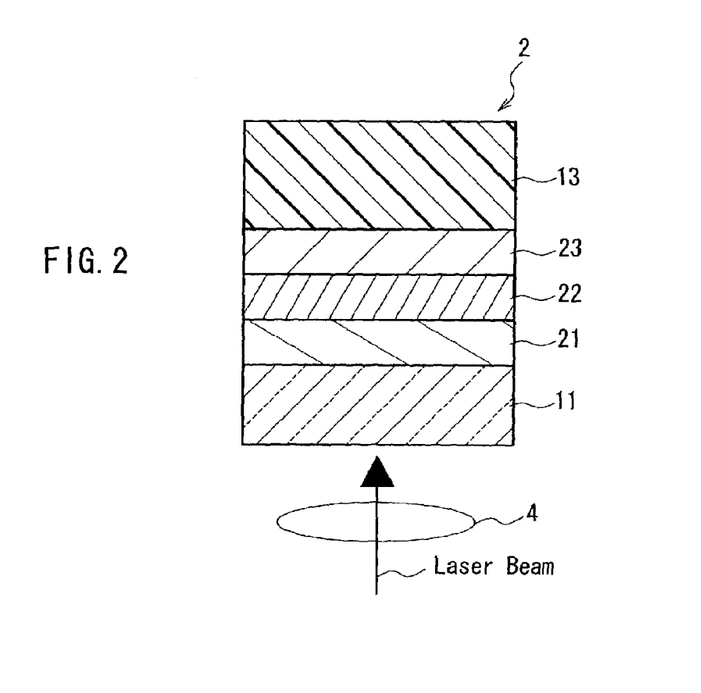
FIG. 2 is a cross-sectional view showing another example of the configuration of an optical information recording medium of the present invention.

FIG. 2 shows another example of the configuration of an optical information recording medium of the present invention. As shown in FIG. 2, an optical information recording medium 2 includes a transparent substrate 11, a first information layer 21, a separating layer 22, a second information layer 23, and a protective substrate 13 in the indicated order. A laser beam focused by an objective lens 4 enters the medium from the transparent substrate side. The second information layer 23, which is located farther from the transparent substrate 11 on the laser beam incident side, has the same film configuration as that of the information layer 12 of the optical information recording medium 1 in FIG. 1. The information layer 21 formed on the transparent substrate 11 also may have the same film configuration as that of the information layer 12. To achieve a sufficient transmittance, however, the first information layer 21 should be configured so that the thickness of the reflective film is reduced, e.g., to about 20 nm or less, the reflective film is removed, or an optical interference film with a high refractive index (about 2.2 or more) is formed on the side of the reflective film opposite to the laser beam incident side. Information is recorded/reproduced with respect to each of the information layers 21, 23 by irradiating the optical information recording medium 2 with a laser beam focused by the objective lens 4 from the transparent substrate side. This optical information recording medium 2 is an example of a multilayer recording medium that includes two information layers. However, an additional information layer can be stacked via a separating layer. In such a case, the additional information layer may have the same film configuration as that of the information layer 12.

A material substantially transparent to the wavelength of a laser beam is suitable for the transparent substrate 11. Examples of the material include polycarbonate, polymethyl methacrylate, polyolefin, a norbornene resin, an ultraviolet curable resin, glass, and an appropriate combination of these substances. The thickness of the transparent substrate 11 is not particularly limited, and can be about 0.01 mm to 1.5 mm.

Examples of a material for the first and the second protective film 14, 18 include an oxide of at least one element selected from the group consisting of Y, Ce, Ti, Zr, Nb, Ta, Co, Zn, Al, Si, Ge, Sn, Pb, Sb, Bi, and Te, a nitride of at least one element selected from the group consisting of Ti, Zr, Nb, Ta, Cr, Mo, W, B, Al, Ga, In, Si, Ge, Sn, and Pb, a carbide of at least one element selected from the group consisting of Ti, Zr, Nb, Ta, Cr, Mo, W, and Si, a sulfide of Zn or Cd, a selenide or telluride, a fluoride of Mg or Ca, a single-element substance of at least one element selected from the group consisting of C, Si, and Ge, and a mixture of these substances. Above all, a mixture of ZnS and $SiO_2$ is particularly preferred because the mixture is substantially transparent and has a low thermal conductivity.

A material for the first interface film 15 includes, e.g., an oxide of at least one element selected from the group consisting of Ti, Zr, Hf, V, Nb, Ta, Cr, Mo, W, and Si or a mixture of these oxides (i.e., a composite oxide). It is preferable that the material for the first interface film 15 include the above oxide or mixture as the main component. Here, the main component should be included in an amount of at least 80 mol %. To eliminate the influence of other components, the main component is preferably not less than 90 mol %, and more preferably not less than 95 mol %.

In particular, a mixture obtained by adding an oxide of at least one element selected from the group consisting of Cr, Mo, and W to an oxide of at least one element selected from the group consisting of Ti, Zr, Hf, V, Nb, and Ta is preferred because of its excellent moisture resistance. It is more preferable that an Si oxide or the like is added further to the mixture so as to achieve a higher erase ratio. When the mixture includes an oxide of at least one element selected from the group consisting of Ti, Zr, Hf, V, Nb, and Ta and an oxide of at least one element selected from the group consisting of Cr, Mo, and W, the content of the oxide of at least one element selected from the group consisting of Cr, Mo, and W with respect to the mixture may be, e.g., 5 mol % to 80 mol % (preferably 10 mol % to 70 mol %, and more preferably 20 mol % to 50 mol %). The thickness of the first interface film 15 is not particularly limited, and preferably is smaller than that of the first protective film 14 (e.g., 1 nm to 20 nm). When the thickness is too small, the first interface film may not be effective, and when the thickness is too large, the first interface film may cause a reduction in recording sensitivity.

Figure 3:
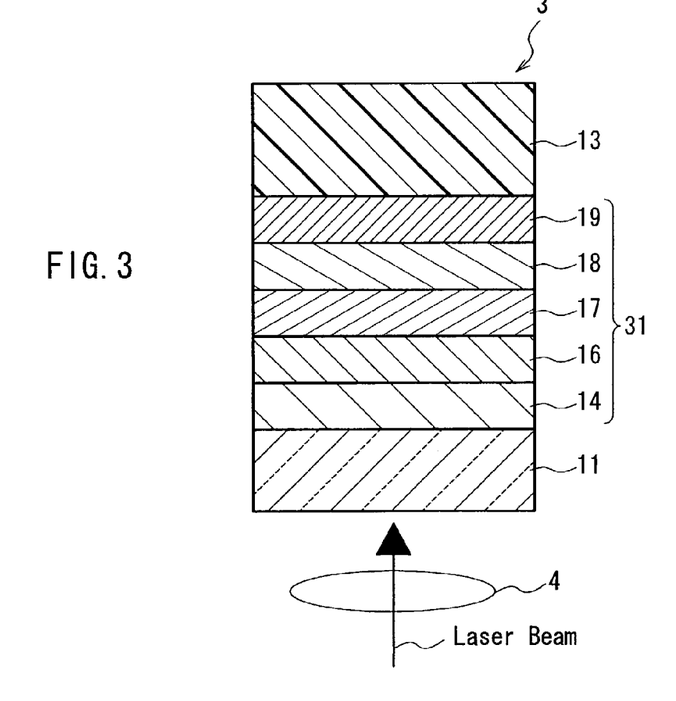
FIG. 3 is a cross-sectional view showing yet another example of the configuration of an optical information recording medium of the present invention.

A material for the second interface film 17 can be, e.g., carbon or a carbide of at least one element selected from the group consisting of Ti, Zr, Hf, V, Nb, Ta, Cr, Mo, W, and Si. The preferred thickness of the second interface film 17 is not less than 0.3 nm and less than 3 nm so that the durability against reproduction light and the reflectance change are improved to achieve good signal quality. When the second interface film 17 has a thickness in this range, the first interface film 15 is not necessarily formed of the above oxide material, and even can be removed. FIG. 3 is a cross-sectional view showing the configuration of an optical information recording medium 3 that includes an information layer 31 in which the second interface film 17 has a thickness of not less than 0.3 nm and less than 3 nm, and the first interface film 15 is removed.

A material for the recording film 16 can be, e.g., a thin film made of a chalcogen material including Te and Sb, such as a Ge—Sb—Te alloy thin film, a Ge—Sn—Sb—Te alloy thin film, and an alloy thin film obtained by adding In, Ge, Au, Ag, etc. to a Sb—Te eutectic composition.

The recording film 16 should have a thickness of 2 nm to 20 nm to achieve a sufficient C/N ratio. When the thickness is less than 2 nm, neither reflectance nor reflectance change is sufficient, thus lowering the C/N ratio. When the thickness is more than 20 nm, the thermal diffusion in the recording film 16 is increased, thus lowering the C/N ratio in high-density recording.

If necessary, at least one element selected from the group consisting of O, N, F, C, S, and B may be added appropriately to the recording film 16 for the purpose of, e.g., adjusting the heat conductivity and the optical constants or improving the heat resistance and the environmental reliability. These additional elements should be not more than 10 at % of the total composition of the recording film 16.

A material for the reflective film 19 can be, e.g., a metal selected from the group consisting of Au, Ag, Cu, Al, Ni, Pd, Pt, Bi, Sb, Sn, Zn, and Cr or an alloy material of these metals. The reflective film 19 may include a plurality of films. For example, a film of Al or Al alloy (a first film) and a film of Ag alloy having a high thermal conductivity (a second film) can be stacked in the indicated order from the laser beam incident side. The first reflective film, which is located on the laser beam incident side, has a larger extinction coefficient k than that of the second reflective film. This reflective film 19 can provide a heat sink effect and increase the reflectance and the reflectance change.

The material and composition of each film in the multilayer thin film can be examined, e.g., by Auger electron spectroscopy, X-ray photoelectron spectroscopy, or secondary ion mass spectrometry (see, e.g., "Handbook of Thin Film Process Technology," edited by the Thin Film and Surface Physics Division of the Japan Society of Applied Physics, Kyoritsu Shuppan Co., Ltd, Japan, 1991).

A material for the protective substrate 13 can be either the same as or different from that of the transparent substrate 11. The material also may not be transparent to the wavelength of the laser beam used. The thickness of the protective substrate 13 is not particularly limited, and can be about 0.01 mm to 3.0 mm.

For the optical information recording medium 2 formed as a multilayer recording medium, the first information layer 21 should have a transmittance of not less than 30%. In addition to a rewritable information layer, a write-once or read-only information layer can be used as the first information layer 21.

For the optical information recording medium 2, a material for the separating layer 22 can be, e.g., an ultraviolet curable resin. The thickness of the separating layer 22 should be at least a depth of focus determined by the numerical aperture (NA) of the objective lens 4 and the wavelength λ of a laser beam, in order to reduce crosstalk arising between the first information layer 21 and the second information layer 23 while either of the information layers is reproduced. It is also necessary to control the whole thickness of the recording medium so that the light beam can be focused on every information layer. For example, when λ=405 nm and NA=0.85, the separating layer 22 should have a thickness of 5 µm to 50 µm.

Two for each of the optical information recording media 1 to 3 shown in FIGS. 1 to 3 can be joined together with their protective substrates 13 opposing each other, thus providing a double-sided structure. Using the double-sided structure can double the amount of information per recording medium.

Next, a method for manufacturing an optical information recording medium of the present invention will be described.

Each thin film of the optical information recording medium can be formed by a vapor-phase thin film deposition technique, such as vacuum evaporation, sputtering, ion plating, CVD (chemical vapor deposition), and MBE (molecular beam epitaxy).

The optical information recording medium 1 can be produced, e.g., in the following manner. The first protective film 14, the first interface film 15, the recording film 16, the second interface film 17, the second protective film 18, and the reflective film 19 are formed in this order on the transparent substrate 11, and then the protective substrate 13 is formed or bonded. Alternatively, the reflective film 19, the second protective film 18, the second interface film 17, the recording film 16, the first interface film 15, and the first protective film 14 are formed in this order on the protective substrate 13, and then the transparent substrate 11 is formed or bonded. The latter is particularly suitable for the transparent substrate 11 having a small thickness of about 0.4 mm or less. When the transparent substrate 11 is made thin, a concave-convex pattern that represents guide grooves for a laser beam, an address signal, etc. is formed preferably on the surface of the protective substrate 13. The pattern can be obtained by transferring a desired pattern that has been formed on a transfer substrate (e.g., a stamper) onto the protective substrate 13.

The optical information recording medium 2 can be produced, e.g., in the following manner. The first information layer 21 is formed on the transparent substrate 11. Then, an ultraviolet curable resin or the like is applied to the first information layer 21 and cured into the separating layer 22. When a concave-convex pattern of grooves, an address signal, etc. are formed on the surface of the separating layer 22, a transfer substrate having a desired pattern is superimposed on the first information layer 21 via the ultraviolet curable resin so as to transfer the desired pattern. The transfer substrate is removed after curing the ultraviolet curable resin. Like the information layer 12 of the optical information recording medium 1, a multilayer film is formed on this separating layer 22 as the second information layer 23. Then, the protective substrate 13 is formed or bonded on the second information layer 23, resulting in a multilayer recording medium. As with the optical information recording medium 1, the optical information recording medium 2 also can be produced by the following manner: forming each of the thin films and the separating layer in order on the protective substrate 13; forming the information layer 21; and bonding the transparent substrate.

When it is difficult to employ a general injection method in forming a concave-convex pattern on the surface of the protective substrate 13 or the separating layer 22 due to its small thickness, particularly for the separating layer 22, a 2P (photo-polymerization) method can be used instead.

Next, a method for recording information signals with respect to an optical information recording medium of the present invention will be described.

Figure 4:
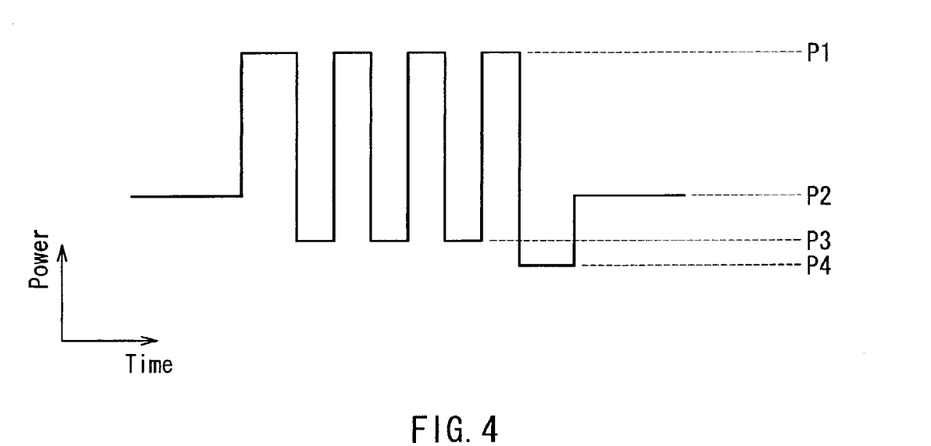
FIG. 4 is an example of a waveform diagram showing the modulated waveform of a laser beam used for recording/reproducing information with respect to an optical information recording medium of the present invention.

To record information signals with respect to an optical information recording medium of the present invention, the intensity of a laser beam is modulated among a plurality of power levels. Examples of a means for modulating the laser beam intensity include the modulation of driving current of a semiconductor laser, and the use of an electro-optical modulator or acousto-optical modulator. A single rectangular pulse with peak power of P1 may be used for a portion where a recording mark is formed. However, when a particularly long mark is formed, it is desirable to use a recording pulse train having a plurality of pulses that is modulated between the peak power P1 and the bottom power P3 (P1>P3), as shown in FIG. 4, in order to exclude excessive heat and achieve a uniform mark width. Moreover, a cooling section to be used for the application of cooling power P4 may be provided after the last pulse of the recording pulse train. The power level is kept constant at bias power P2 (P1>P2) for a portion where no recording mark is formed.

When a recording mark is recorded at two or more different linear velocities, it is preferable that each of the power levels is set so that P3/P1 or P3/P2 increases with linear velocity. This can prevent a reduction in signal amplitude and erasability of the recorded mark in the case of storage at high temperatures.

The mark edge positions may not be uniform due to each pattern of the length of a recording mark to be recorded, the length of a space preceding and following the recording mark, etc., which leads to an increase in jitter. To prevent the nonuniform edge positions and improve the jitter, the above recording method also can adjust and compensate the position or length of each pulse of the pulse train appropriately so that the edge positions are uniform for each pattern.

EXAMPLES

Hereinafter, the present invention will be described in more detail by way of examples. However, the present invention is not limited to the following examples.

Examples 1 to 5 and Comparative Examples 1 to 13

Examples 1 to 5 show the dependence of the recording/reproducing characteristics of an optical information recording medium of the present invention, particularly the C/N ratio, the erase ratio, and the durability against reproduction light, upon an interface film material.

The optical information recording medium 1 that has been described in the embodiment was used as the optical information recording media of the examples 1 to 5 and the comparative examples 1 to 13. A polycarbonate substrate having a diameter of about 12 cm, a thickness of about 1.1 mm, a groove pitch of 0.32 μm, and a groove depth of about 20 nm was used as the protective substrate 13.

Thin films included in the information layer 12 were formed in the following order on the surface of the protective substrate 13 provided with grooves by sputtering. First, an 80 nm thick Ag—Pd—Cu film was formed with an Ag—Pd—Cu target (the ratio of the number of atoms 98:1:1) while introducing an Ar gas. Then, a 5 nm thick Al film was formed with an Al target while introducing an Ar gas. The Ag—Pd—Cu film and the Al film served as the reflective film 19. The second protective film 18 having a thickness of 15 nm was formed with a ZnS—SiO$_2$ target (ZnS: 80 mol %, SiO$_2$: 20 mol %) while introducing an Ar gas. The second interface film 17 having a thickness of 5 nm was formed with a target of predetermined composition. The composition of the target for the second interface film 17 differed according to each of the examples and the comparative examples. The recording film 16 having a thickness of 10 nm was formed with a Ge—Sb—Te target (the ratio of the number of atoms 45:4:51) while introducing a gas mixture of Ar and N$_2$ (the flow ratio 98:2). The first interface film 15 having a thickness of 5 nm was formed with a target of predetermined composition. The composition of the target for the first interface film 15 differed according to each of the examples and the comparative examples. The first protective film 14 having a thickness of 55 nm was formed with a ZnS—SiO$_2$ target (ZnS: 80 mol %, SiO$_2$: 20 mol %) while introducing an Ar gas. Then, a polycarbonate sheet having a thickness of about 0.09 mm and a diameter of about 12 cm was bonded to the surface of the information layer 12 thus produced (i.e., the surface of the first protective film 14) via an ultraviolet curable resin. Subsequently, the ultraviolet curable resin was cured by the irradiation of ultraviolet rays, so that the transparent substrate 11 having a thickness of about 0.1 mm was produced.

Various materials were used to form the first and the second interface film 15, 17 of the optical information recording medium in each of the examples and the comparative examples. Table 1 shows materials for the interface films (the interface film material) and the film formation conditions (the target composition and the sputtering gas composition). The analysis by Auger electron spectroscopy showed that the compositions of each film formed by sputtering were substantially the same as that of the target composition.

TABLE 1

| Interface film material | Deposition conditions | |
|---|---|---|
| | Target composition | Gas composition |
| Ta$_2$O$_5$ | Ta$_2$O$_5$ | Ar |
| ZrO$_2$—Cr$_2$O$_3$ | ZrO$_2$: 70 mol % Cr$_2$O$_3$: 30 mol % | Ar |
| ZrO$_2$—Cr$_2$O$_3$—SiO$_2$ | ZrO$_2$: 35 mol % Cr$_2$O$_3$: 30 mol % SiO$_2$: 35 mol % | Ar |
| Ge—Cr—N | Ge: 90 at % Cr: 10 at % | Ar:N$_2$ = 60:40 (flow ratio) |
| C | C | Ar |
| TiC | TiC | Ar |
| SiC | SiC | Ar |

Table 2 shows the interface film material and the evaluation of C/N ratio, erasure ratio, and maximum reproduction power for each of the optical information recording media of the examples 1 to 5 and the comparative examples 1 to 13. The following is an explanation of a method for evaluating the C/N ratio, the erasure ratio, and the maximum reproduction power.

Using an optical system having a wavelength of 405 nm and a numerical aperture of 0.85, single signals at 12.2 MHz and 3.3 MHz were recorded alternately on the grooves of each optical information recording medium while rotating the medium at a linear velocity of 4.5 m/s. In this case, the grooves are the convex portions when viewed from the laser beam incident side. A rectangular pulse modulated between the peak power P1 and the bias power P2 was used to record the signals. For the 12.2 MHz signal, a single pulse having a pulse width of 13.7 ns was used. For the 3.3 MHz signal, a pulse train was used that consisted of a leading pulse having a pulse width of 20.5 ns and the subsequent eight subpulses having a pulse width of 6.9 ns and a pulse interval of 6.9 ns.

Under these conditions, signals at 12.2 MHz and 3.3 MHz were recorded alternately 10 times on a track in the unrecorded state. Then, the 12.2 MHz signal further was recorded on the track to measure the C/N ratio with a spectrum analyzer. Subsequently, the 3.3 MHz signal further was recorded on the track to measure the erase ratio (i.e., the damping ratio of the amplitude of the 12.2 MHz signal) with the spectrum analyzer. The set power P1 was 1.3 times the power by which the amplitude became 3 dB lower than the maximum. The set power P2 was the central value in the power range over which the erase ratio became greater than 25 dB. For each optical information recording medium, P1 was 4.5 mW to 5.5 mW and P2 was 2.0 mW to 2.5 mW. The track, where the 12.2 MHz signal was recorded by the set power, was reproduced continuously while varying the reproduction power, and a change in C/N ratio was measured. The maximum value of the reproduction power (the maximum reproduction power) was determined based on the fact that the C/N ratio decreased by 0.3 dB or less during 10,000 revolutions of the medium. The following is the evaluation criteria of the C/N ratio, the erase ratio, and the maximum reproduction power thus determined for each optical information recording medium.

C/N Ratio
  ⊚: not less than 54 dB
  ○: not less than 52 dB and less than 54 dB
  Δ: not less than 50 dB and less than 52 dB
  ×: less than 50 dB Erase Ratio
  ⊚: not less than 33 dB
  ○: not less than 30 dB and less than 33 dB
  Δ: not less than 27 dB and less than 30 dB
  ×: less than 27 dB Maximum Reproduction Power
  ⊚: not less than 0.5 mW
  ○: not less than 0.4 mW and less than 0.5 mW
  Δ: not less than 0.3 mW and less than 0.4 mW
  ×: less than 0.3 mW

TABLE 2

| | Interface film material | | Evaluation | | |
| --- | --- | --- | --- | --- | --- |
| | First interface film | Second interface film | C/N | Erase ratio | Maximum reproduction power |
| Example 1 | $Ta_2O_5$ | C | ○ | ○ | ⊚ |
| Example 2 | $ZrO_2$—$Cr_2O_3$ | C | ○ | ○ | ⊚ |
| Example 3 | $ZrO_2$—$Cr_2O_3$—$SiO_2$ | C | ○ | ⊚ | ⊚ |
| Example 4 | $ZrO_2$—$Cr_2O_3$—$SiO_2$ | TiC | ○ | ⊚ | ⊚ |
| Example 5 | $ZrO_2$—$Cr_2O_3$—$SiO_2$ | SiC | ○ | ⊚ | ⊚ |
| Comparative example 1 | Ge—Cr—N | Ge—Cr—N | ○ | ○ | X |
| Comparative example 2 | C | Ge—Cr—N | X | ○ | ⊚ |
| Comparative example 3 | TiC | Ge—Cr—N | X | ○ | ⊚ |
| Comparative example 4 | SiC | Ge—Cr—N | X | ○ | ⊚ |
| Comparative example 5 | Ge—Cr—N | C | Δ | ○ | ○ |
| Comparative example 6 | Ge—Cr—N | TiC | Δ | ○ | ○ |
| Comparative example 7 | Ge—Cr—N | SiC | Δ | ○ | ○ |
| Comparative example 8 | $Ta_2O_5$ | Ge—Cr—N | ⊚ | ○ | Δ |
| Comparative example 9 | $ZrO_2$—$Cr_2O_3$ | Ge—Cr—N | ⊚ | ○ | Δ |
| Comparative example 10 | $ZrO_2$—$Cr_2O_3$—$SiO_2$ | Ge—Cr—N | ⊚ | ⊚ | Δ |
| Comparative example 11 | Ge—Cr—N | $Ta_2O_5$ | ⊚ | ○ | X |
| Comparative example 12 | Ge—Cr—N | $ZrO_2$—$Cr_2O_3$ | ⊚ | ○ | X |
| Comparative example 13 | Ge—Cr—N | $ZrO_2$—$Cr_2O_3$—$SiO_2$ | ⊚ | ⊚ | X |

As can be seen from the evaluation, for the recording medium of the comparative example 1 that used Ge—Cr—N as the first and the second interface films, the maximum reproduction power is low and insufficient, though the C/N ratio and the erase ratio are sufficient.

For the recording media of the comparative examples 2 to 4 that used carbon or carbide as the first interface film, the maximum reproduction power is improved dramatically compared with the comparative example 1. However, the C/N ratio is reduced. For the recording media of the comparative examples 5 to 7 that used carbon or carbide as the second interface film, the maximum reproduction power is sufficiently high. However, an increase in C/N ratio is not sufficient, though it is slightly larger than that of the comparative examples 2 to 4.

For the recording media of the comparative examples 8 to 10 that used an oxide as the first interface film, the C/N ratio further increases compared with the comparative example 1. However, an improvement in maximum reproduction power is not sufficient, though it is slightly larger than that of the comparative example 1. For the recording media of the comparative examples 11 to 13 that used an oxide as the second interface film, a high C/N ratio is achieved as with the comparative examples 8 to 10. However, the maximum reproduction power is low.

In contrast, for the recording media of the examples 1 to 5 that used an oxide as the first interface film and carbon or carbide as the second interface film, both the C/N ratio and the erase ratio are sufficient, and the maximum reproduction power also is extremely high. Particularly, the recording media of the examples 3 to 5 that used a mixture of $ZrO_2$, $Cr_2O_3$, and $SiO_2$ as the first interface film can provide an even higher erase ratio.

As described above, the maximum reproduction power can be improved by using carbon or carbide as the second interface film that is located on the side of the recording film opposite to the laser beam incident side. Moreover, a sufficient C/N ratio and erase ratio can be achieved by using an oxide as the first interface film that is located on the laser beam incident side of the recording film. This leads to a further improvement in maximum reproduction power.

Examples 6 to 11 and Comparative Examples 14 to 19

Examples 6 to 11 show the dependence of the recording/reproducing characteristics of an optical information recording medium of the present invention, particularly the C/N ratio, the erase ratio, and the durability against reproduction light, upon the thickness of the second interface film.

The optical information recording media of the examples 6 to 11 and the comparative examples 14 to 19 were produced in the same manner as that for the comparative example 5 so that they had the same configuration as that of the recording medium of the comparative example 5 and differed from one another in thickness of the second interface film. The recording media of examples 6 to 11 and the comparative examples of 14 to 19 thus produced were evaluated in the same manner as that described above. Table 3 shows the thickness of the second interface film and the evaluation for each optical information recording medium.

TABLE 3

| | Second interface film thickness (nm) | Evaluation | | |
| --- | --- | --- | --- | --- |
| | | C/N | Erase ratio | Maximum reproduction power |
| Comparative example 14 | 0.1 | Δ | X | X |
| Comparative example 15 | 0.2 | ○ | ○ | Δ |
| Example 6 | 0.3 | ○ | ○ | ○ |
| Example 7 | 0.5 | ⊚ | ○ | ○ |
| Example 8 | 0.7 | ⊚ | ⊚ | ○ |
| Example 9 | 1.0 | ⊚ | ⊚ | ○ |
| Example 10 | 1.5 | ○ | ⊚ | ○ |
| Example 11 | 2.0 | ○ | ⊚ | ○ |
| Comparative example 16 | 3.0 | Δ | ⊚ | ○ |
| Comparative example 17 | 5.0 | Δ | ○ | ○ |
| Comparative example 18 | 7.0 | Δ | ○ | ○ |
| Comparative example 19 | 10.0 | Δ | ○ | ⊚ |

As can be seen from the evaluation, the maximum reproduction power is improved with an increase in thickness of the second interface film, which is located on the side of the recording film opposite to the laser beam incident side. However, when the second interface film has a thickness of not less than 3.0, the C/N ratio is reduced. Moreover, the thickness of the second interface film should be not less than 0.3 nm so as to increase the erase ratio and the maximum reproduction power. Therefore, all of the C/N ratio, the erase ratio, and the maximum reproduction power can be satisfied by forming the second interface film to have a thickness of not less than 0.3 nm and less than 3 nm without using an oxide as the first interface film.

As described above, the present invention can provide an optical information recording medium that can achieve high durability against reproduction light and good signal quality even if information is recorded/reproduced by an optical system having a short wavelength and a large numerical aperture, and a recording/reproducing method for the optical information recording medium.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising at least one information layer, the information layer comprising:
   a first protective film;
   a first interface film;
   a recording film having optical characteristics that are changed reversibly by laser beam irradiation;
   a second interface film;
   a second protective film; and
   a reflective film, present in the indicated order from a laser beam incident side, wherein the second interface film includes carbon or a carbide of at least one element selected from the group consisting of Ti, Zr, Hf, V, Nb, Ta, Cr, Mo, W, and Si, and the first interface film includes a mixture of an oxide of at least one element selected from the group consisting of Ti, Zr, Hf, V, Nb, and Ta and an oxide of at least one element selected from the group consisting of Cr, Mo, and W.

2. An optical information recording medium comprising a multilayer structure comprising a first information layer to a nth information layer that are stacked in order from the laser beam incident side (n is a natural number not less than 2), at least one of the first information layer to the nth information layer comprising:

a first protective film;
a first interface film;
a recording film having optical characteristics that are changed reversibly by laser beam irradiation;
a second interface film;
a second protective film; and
a reflective film, present in the indicated order from a laser beam incident side,
wherein the first interface film includes an oxide of at least one element selected from the group consisting of Ti, Zr, Hf, V, Nb, Ta, Cr, Mo, W, and Si, and
the second interface film includes carbon or a carbide of at least one element selected from the group consisting of Ti, Zr, Hf, V, Nb, Ta, Cr, Mo, W, and Si.

3. The optical information recording medium according to claim 2, wherein at least the nth information layer comprises the first protective film, the first interface film, the recording film, the second interface film, the second protective film, and the reflective film, present in the indicated order from the laser beam incident side, the first interface, film includes an oxide of at least one element selected from the group consisting of Ti, Zr, Hf, V, Nb, Ta, Cr, Mo, W,and Si, and
the second interface film includes carbon or a carbide of at least one element selected from the group consisting of Ti, Zr, Hf, V, Nb, Ta, Cr, Mo, W, and Si.

4. The optical information recording medium according to claim 2, wherein the first interface film includes a mixture of an oxide of at least one element selected from the group consisting of Ti, Zr, Hf, V, Nb, and Ta and an oxide of at least one element selected from the group consisting of Cr, Mo, and W.

5. The optical information recording medium according to claim 1, wherein the mixture includes an oxide of at least one element selected from the group consisting of Cr, Mo, and W in an amount of not less than 5 mol % and not more than 80 mol %.

6. The optical information recording medium according to claim 4, wherein the mixture includes an oxide of at least one element selected from the group consisting of Cr, Mo, and W in an amount of not less than 5 mol % and not more than 80 mol %.

7. The optical information recording medium according to claim 1, wherein the mixture further includes an Si oxide.

8. The optical information recording medium according to claim 4, wherein the mixture further includes an Si oxide.

9. The optical information recording medium according to claim 7, wherein the mixture includes the Si oxide in an amount of not less than 5 mol % and not more than 60 mol %.

10. The optical information recording medium according to claim 8, wherein the mixture includes the Si oxide in an amount of not less than 5 mol % and not more than 60 mol %.

11. An optical information recording medium comprising a multilayer structure comprising a first information layer to a nth information layer that are stacked in order from a laser beam incident side (n is a natural number not less than 2), at least one of the first information layer to the nth information layer comprising:

a first protective film;
a recording film having optical characteristics that are changed reversibly by laser beam irradiation;
an interface film;
a second protective film; and
a reflective film, present in the indicated order from the laser beam incident side,
wherein the interface film includes a carbide of at least one element selected from the group consisting of Ti, Zr, Hf, V, Nb, Ta, Cr, Mo, W, and Si and has a thickness of not less than 0.3 nm and up to 1 nm.

12. The optical information recording medium according to claim 11, wherein the medium has a multilayer structure comprising a first information layer to a nth information layer that are stacked in order from the laser beam incident side (n is a natural number not less than 2), and at least one of the first information layer to the nth information layer corresponds to the information layer as recited in claim 11.

13. The optical information recording medium according to claim 11, wherein at least the nth information layer comprises the first protective film, the recording film, the interface film, the second protective film, and the reflective film, present in the indicated order from the laser beam incident side.

14. The optical information recording medium according to claim 1, wherein the reflective film comprises a first film of Al or Al alloy and a second film of Ag alloy, and the first film and the second film are stacked in the indicated order from the laser beam incident side.

15. The optical information recording medium according to claim 11, wherein the reflective film comprises a first film of Al or Al alloy and a second film of Ag alloy, and the first film and the second film are stacked in the indicated order from the laser beam incident side.

16. The optical information recording medium according to claim 1, wherein the recording film is at least one selected from the group consisting of a Ge—Sb—Te alloy film, a Ge—Sn—Sb—Te alloy film, a Ag—In—Sb—Te alloy film, an In—Ge—Sb—Te alloy film, and a Ag—In—Ge—Sb—Te alloy film.

17. The optical information recording medium according to claim 11, wherein the recording film is at least one selected from the group consisting of a Ge—Sb—Te alloy film, a Ge—Sn—Sb—Te alloy film, a Ag—In—Sb—Te alloy film, an In—Ge—Sb—Te alloy film, and a Ag—Tn—Ge—Sb—Te alloy film.

18. A method for recording/reproducing information with respect to an optical information recording medium comprising:

recording/reproducing information with respect to the optical information recording medium according to claim 1 or 11,
wherein the information is recorded/reproduced by an optical system having a wavelength of not more than 450 nm and a numerical aperture of not less than 0.8.

* * * * *